(12) United States Patent
Urrea et al.

(10) Patent No.: US 11,479,152 B2
(45) Date of Patent: Oct. 25, 2022

(54) CHILD SAFETY SEAT

(71) Applicant: BRITAX CHILDCARE (ZHONGSHAN) COMPANY LIMITED, Guangdong (CN)

(72) Inventors: Alberto Garcia Urrea, Tarragona (ES); Jackson Kwok, Hong Kong (CN); Oliver Gao, Guangdong (CN); Meiping Huang, Guangdong (CN)

(73) Assignee: BRITAX CHILDCARE (ZHONGSHAN) COMPANY LIMITED, Guangdong (CN)

( * ) Notice: Subject to any disclaimer, the term of this patent is extended or adjusted under 35 U.S.C. 154(b) by 0 days.

(21) Appl. No.: 17/262,665

(22) PCT Filed: Jul. 24, 2018

(86) PCT No.: PCT/CN2018/096785
§ 371 (c)(1),
(2) Date: Jan. 22, 2021

(87) PCT Pub. No.: WO2020/019150
PCT Pub. Date: Jan. 30, 2020

(65) Prior Publication Data
US 2021/0300216 A1  Sep. 30, 2021

(51) Int. Cl.
*B60N 2/28* (2006.01)
(52) U.S. Cl.
CPC .... *B60N 2/2806* (2013.01); *B60N 2002/2815* (2013.01)

(58) Field of Classification Search
CPC .......... B60N 2/2806; B60N 2002/2815; B60N 2002/2818
See application file for complete search history.

(56) References Cited

U.S. PATENT DOCUMENTS

| 5,611,596 A * | 3/1997 | Barley | B60N 2/2821 297/363 |
| 5,839,789 A * | 11/1998 | Koledin | B60N 2/2806 297/250.1 |
| 5,957,531 A | 9/1999 | Kane et al. | |

(Continued)

FOREIGN PATENT DOCUMENTS

| CN | 104024042 | 9/2014 |
| CN | 104553903 | 4/2015 |
| TW | 200520994 | 7/2005 |

*Primary Examiner* — Philip F Gabler
(74) *Attorney, Agent, or Firm* — K&L Gates LLP

(57) ABSTRACT

A child safety seat (1) is held in a vehicle by a vehicle seat belt (70). The child safety seat (1) includes a seat shell comprising a base section (20) and a backrest section (10), and a tensioning system (50) that acts to alter the effective path of travel of the vehicle seat belt (70). The tensioning system (50) comprises a pair of belt carriages (56) for acting upon intermediate portions of the belt (70). The belt carriages (56) are adjustably moveable relative to the seat shell such that the effective path of travel of the vehicle seat belt (70) is able to be adjusted to increase tension in the seat belt (70). The child safety seat (1) can be correctly installed in the vehicle and can ensure that any remaining slack is removed from the vehicle seat belt (70), such that in the event of an accident, movement of the child safety seat (1) relative to the vehicle is reduced.

18 Claims, 9 Drawing Sheets

(56) References Cited

U.S. PATENT DOCUMENTS

| | | | | |
|---|---|---|---|---|
| 6,508,510 B2* | 1/2003 | Yamazaki | ............ | B60N 2/2806 |
| | | | | 297/250.1 |
| 7,195,315 B2* | 3/2007 | Rikhof | ................ | B60N 2/2806 |
| | | | | 297/256.16 |
| 7,837,264 B2 | 11/2010 | Van Der Bijl et al. | | |
| 8,262,161 B2* | 9/2012 | Fritz | .................... | B60N 2/2863 |
| | | | | 297/256.16 |
| 8,789,886 B2* | 7/2014 | Mason | ................ | B60N 2/2806 |
| | | | | 297/253 |
| 8,973,991 B2* | 3/2015 | Wuerstl | ............... | B60N 2/2821 |
| | | | | 297/253 |
| 9,365,135 B2* | 6/2016 | Carpenter | ............ | B60N 2/2803 |
| 9,499,074 B2* | 11/2016 | Strong | ................ | B60N 2/2812 |
| 10,035,436 B2* | 7/2018 | Zhou | .................... | B60N 2/2806 |
| 10,189,381 B2* | 1/2019 | Williams | ............. | B60N 2/2806 |
| 10,737,593 B1* | 8/2020 | Shellenberger | ...... | B60N 2/2806 |
| 2018/0056822 A1* | 3/2018 | Anderson | ............ | B60N 2/2845 |

\* cited by examiner

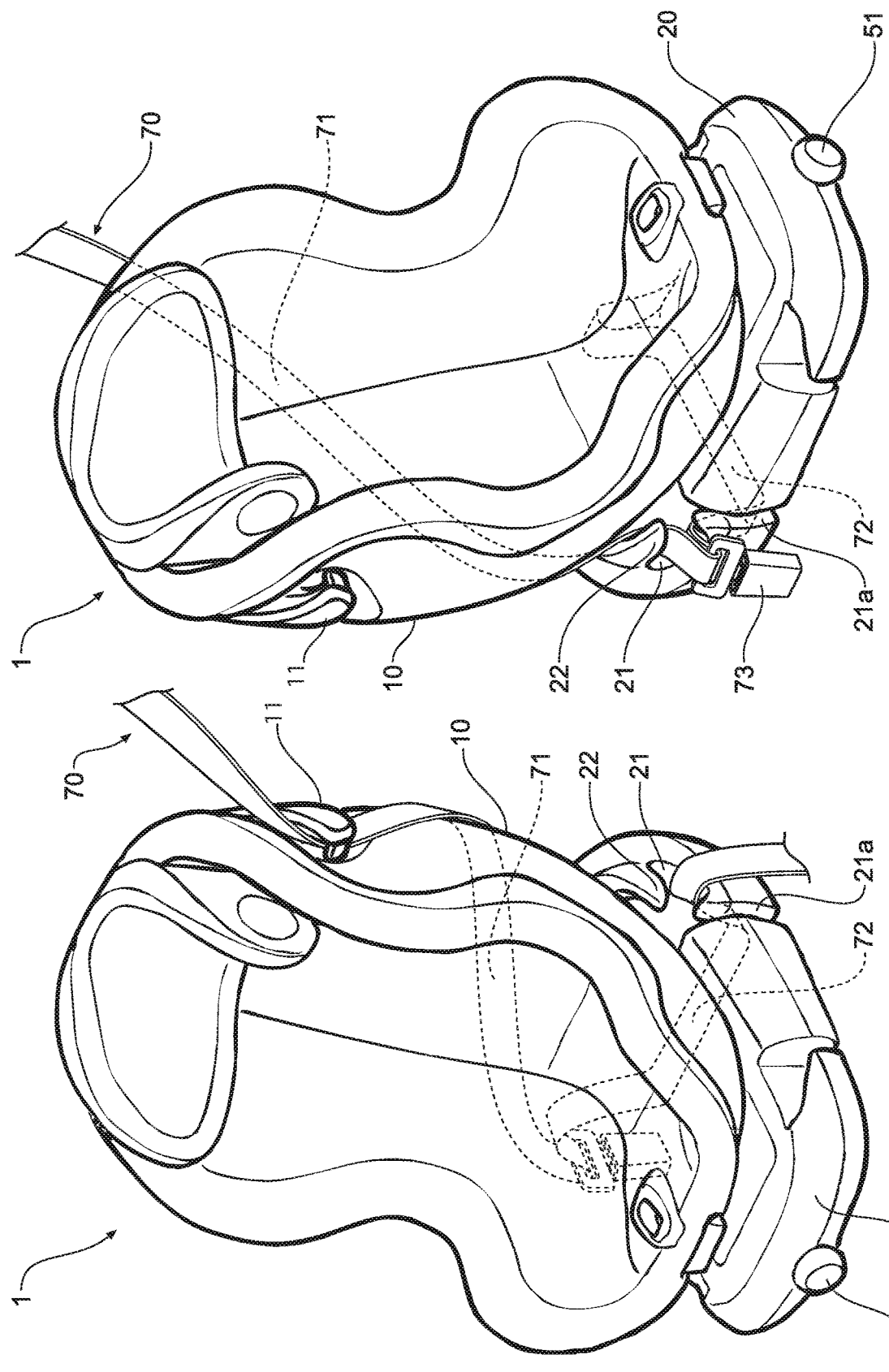

CHILD SAFETY SEAT

CROSS REFERENCE TO RELATED APPLICATIONS

The present application is a National Stage of International Application No. PCT/CN2018/096785, filed on Jul. 24, 2018, the entire contents of which are being incorporated herein by reference.

TECHNICAL FIELD

The present invention relates to a child safety seat.

BACKGROUND

Child safety seats are configured to be installed within a vehicle and may be held in place by a vehicle seat belt typically having a sash portion and a lap portion. In the event of an accident, the seat belt will prevent, or at least reduce movement of the child safety seat relative to the vehicle.

In order to ensure that the child safety seat is correctly installed in the vehicle, it is necessary for the installer to correctly engage the vehicle seat belt with the child safety seat, and to ensure that any remaining slack is removed from the vehicle seat belt, such that in the event of an accident, movement of the child safety seat relative to the vehicle is reduced.

In many instances, the end user of the child safety seat will not have the strength or dexterity to remove the remaining slack from the belt prior to use, resulting in a sub-optimal installation of the child safety seat.

It is against this background that the present invention has been developed.

SUMMARY

According to a first aspect, there is provided a child safety seat that is held in a vehicle by a vehicle seat belt, the child safety seat including a seat shell comprising a base section and a backrest section, and a tensioning system that acts to alter the effective path of travel of the vehicle seat belt, wherein the tensioning system comprises a pair of belt carriages for acting upon intermediate portions of the belt, and wherein the belt carriages are adjustably moveable relative to the seat shell such that the effective path of travel of the vehicle seat belt is able to be adjusted.

In one form each belt carriage comprises a carriage belt slot configured to act upon an intermediate portion of the belt.

In one form the tensioning system further comprises a guide carriage slidably constrained to move in a fore and aft direction with respect to the seat shell, and the belt carriages are constrained to move in a direction perpendicular to the direction of movement of the guide carriage, and the belt carriages are slidably connected to the guide carriage, such that fore and aft movement of the guide carriage causes inward and outward movement of the belt carriages respectively.

In one form the belt carriages are slidably connected to the guide carriage by virtue of a pin and slot arrangement, where each belt carriage features an angled guide slot configured to receive and retain the head of a guide pin which is secured to the guide carriage.

In one form the tensioning system further comprises an axle and screw portion, and the guide carriage comprises an internally threaded portion, wherein the screw portion and internally threaded portion are configured to interact in a leadscrew arrangement, where rotation of the axle and screw portion in one direction causes the guide carriage to move forward with respect to the screw portion, and rotation of the axle and screw portion in the other direction causes the guide carriage to move rearward with respect to the screw portion.

In one form the base section comprises an upper portion and a lower portion, and that the two portions house the belt tensioning system.

In one form the base section comprises a pair of belt slots, each made up of respective upper and lower belt slot portions, and the belt carriages are adjustably movable from a first position, where the carriage belt slots are aligned with respective upper and lower belt slot portions such that a user can insert the seat belt through each of the upper and lower slot portions and the carriage belt slots, through to a second position, where the carriage belt slots are misaligned with respective upper and lower belt slot portions, such that the effective path of travel of the vehicle seat belt is increased over the path of travel of the vehicle seat belt when the belt carriages are in their first position.

In one form each belt carriage further comprises a block which extends into the belt slots of the base section, preventing insertion of the seat belt into the belt slots of the base section when each belt carriage is in a second position.

BRIEF DESCRIPTION OF DRAWINGS

Embodiments of the present invention will be discussed with reference to the accompanying drawings wherein:

FIGS. 1A and 1B are top perspective schematic views of a child safety seat according to an embodiment, installed within a vehicle and held in place by a vehicle seat belt;

DESCRIPTION OF EMBODIMENTS

Figures 2A, 2B:
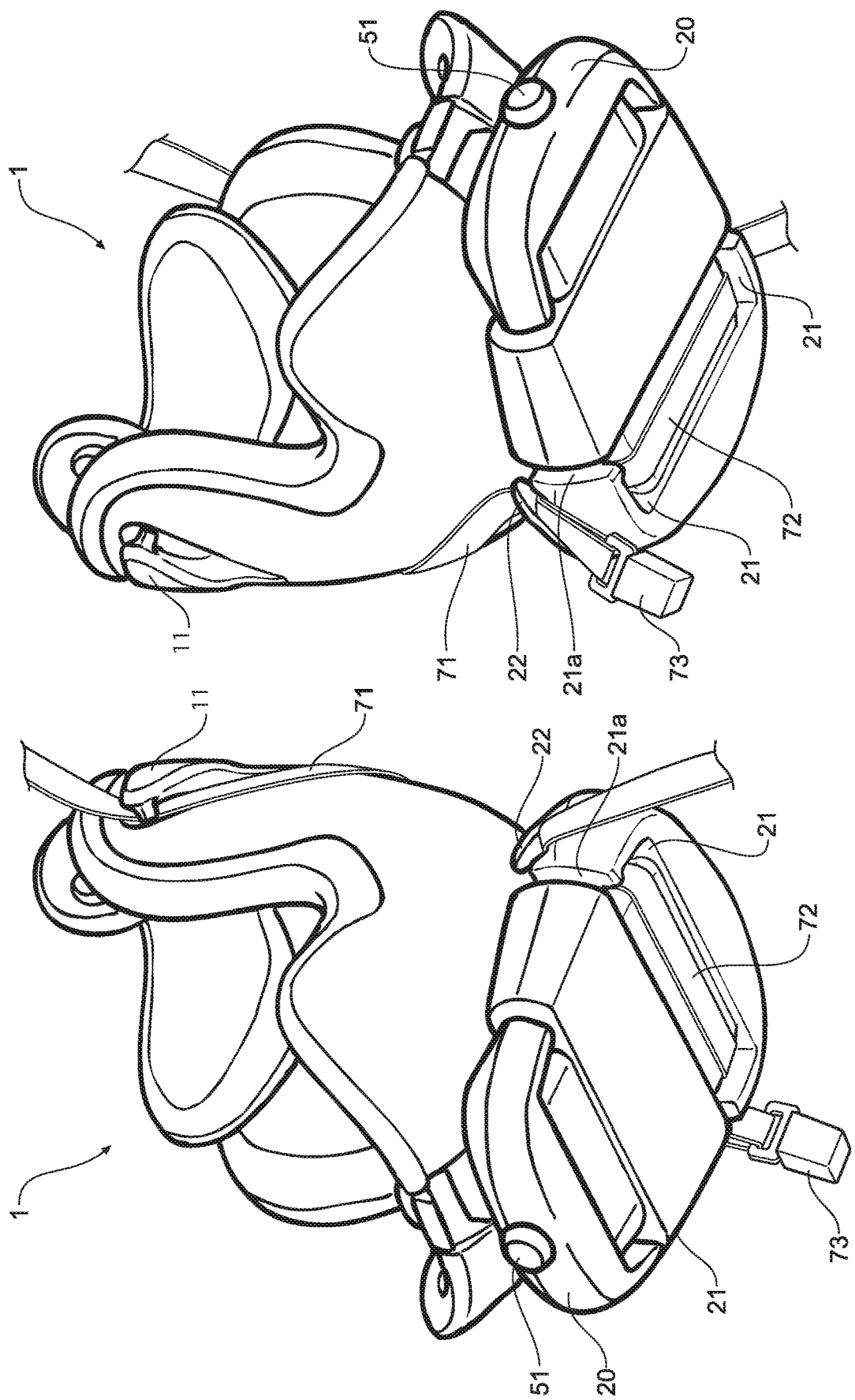
FIGS. 2A and 2B are bottom perspective views of the child safety seats of FIGS. 1A and 1B.

Referring to FIGS. 1A to 11B, there is shown a child safety seat 1 that is held in a vehicle by a vehicle seat belt 70, the child safety seat 1 including a seat shell comprising a base section (or seat base) 20 and a backrest section 10, and a tensioning system 50 that acts to alter the effective path of travel of the vehicle seat belt 70. The tensioning system 50 comprises a pair of belt carriages 56 for acting upon intermediate portions of the belt 70, wherein the belt carriages 56 are adjustably moveable relative to the seat shell such that the effective path of travel of the vehicle seat belt 70 is able to be adjusted.

Referring to FIGS. 1A to 2B, the child safety seat 1 is held in place by a conventional vehicle seat belt 70 having a sash portion 71 and a lap portion 72 separated by a buckle assembly 73, where the sash portion 71 terminates at a seat belt retractor (not shown), and the lap portion terminates at an anchor point (not shown). It can be seen that the sash portion 71 of the belt is guided behind the seat backrest 10 via an upper belt guide 11 and lower belt guide 22, and the lap portion 72 is guided underneath the seat base 20 via a pair of belt slots 21 where it terminates at the anchor point. It will be appreciated that the lap portion 72 is inserted into the belt slots 21 via respective gates 21a.

While in the embodiment shown, the upper and lower belt guides 11, 22 act to guide the sash portion 71 of the vehicle seat belt 70 behind the backrest 10, it will be appreciated that in alternative embodiments, the guides may comprise seat belt lock off devices, which act to hold the belt in place relative to the guides. It will also be appreciated that by virtue of the child safety seat featuring upper and lower belt guides 11, 22 on both sides, the child safety seat is capable of being installed with a vehicle seat belt being inserted from either side. It will further be appreciated that a child safety seat could be installed with a lap belt only.

The upper belt guides 11 may be reinforced by a U-shaped reinforcing bar (not shown) which may wrap around the backrest 10 of the seat 1, in order to strengthen the upper belt guides 11 when the child safety seat 1 is forward facing, and to provide side-impact protection to the occupant of the seat. The reinforcing bar may be formed from an extruded channel section, alternatively it may be formed from a composite.

Figure 3:
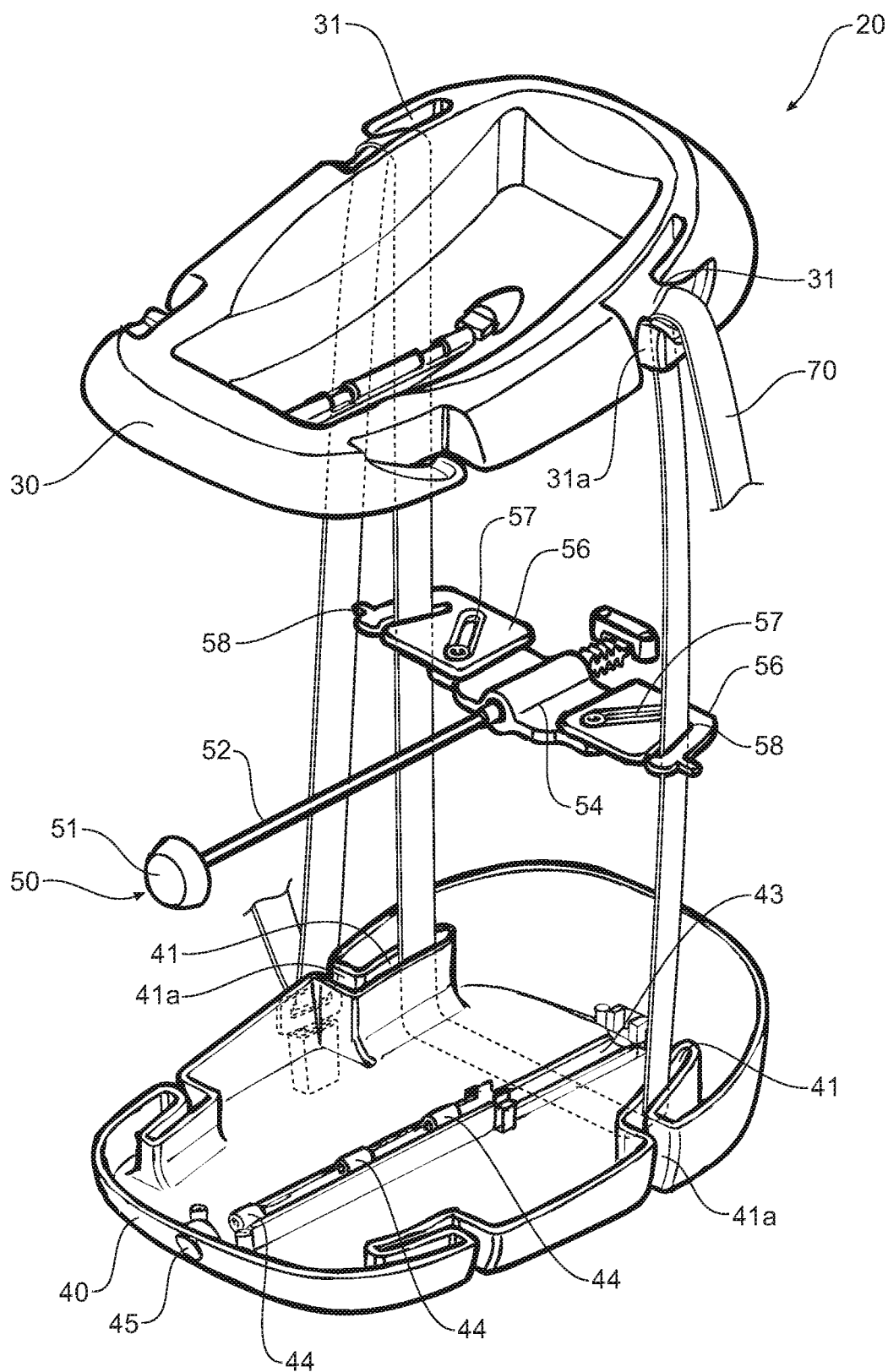
FIG. 3 is a partially exploded perspective view of the seat base of the child safety seat of FIGS. 1A and 1B and vehicle seat belt, according to an embodiment.

Referring now to FIG. 3, where there is shown a partially exploded view of the seat base 20 and the vehicle seat belt 70. It can be seen that the seat base 20 comprises an upper portion 30 and a lower portion 40, and that the two portions house a belt tensioning system 50. It can also be seen that the belt slots 21 are made up of respective upper and lower belt slot portions 31, 41 and gates 31a, 41a in the upper and lower portions 30, 40 respectively.

The belt tensioning system 50 comprises a pair of belt carriages 56, where each carriage comprises a belt slot 58 configured to act upon an intermediate portion of the lap portion 72 of the vehicle seat belt 70.

It can be seen that the lap portion 72 of the seat belt 70 passes down through an upper belt slot portion 31, a carriage belt slot 58 and lower belt slot portion 41 on one side of the seat base 20, where it then extends underneath the lower portion 40 of the seat base 20 and passes up through a lower belt slot portion 41, carriage belt slot 58 and upper belt slot portion 31 on the other side of the seat base 20.

Figure 4:
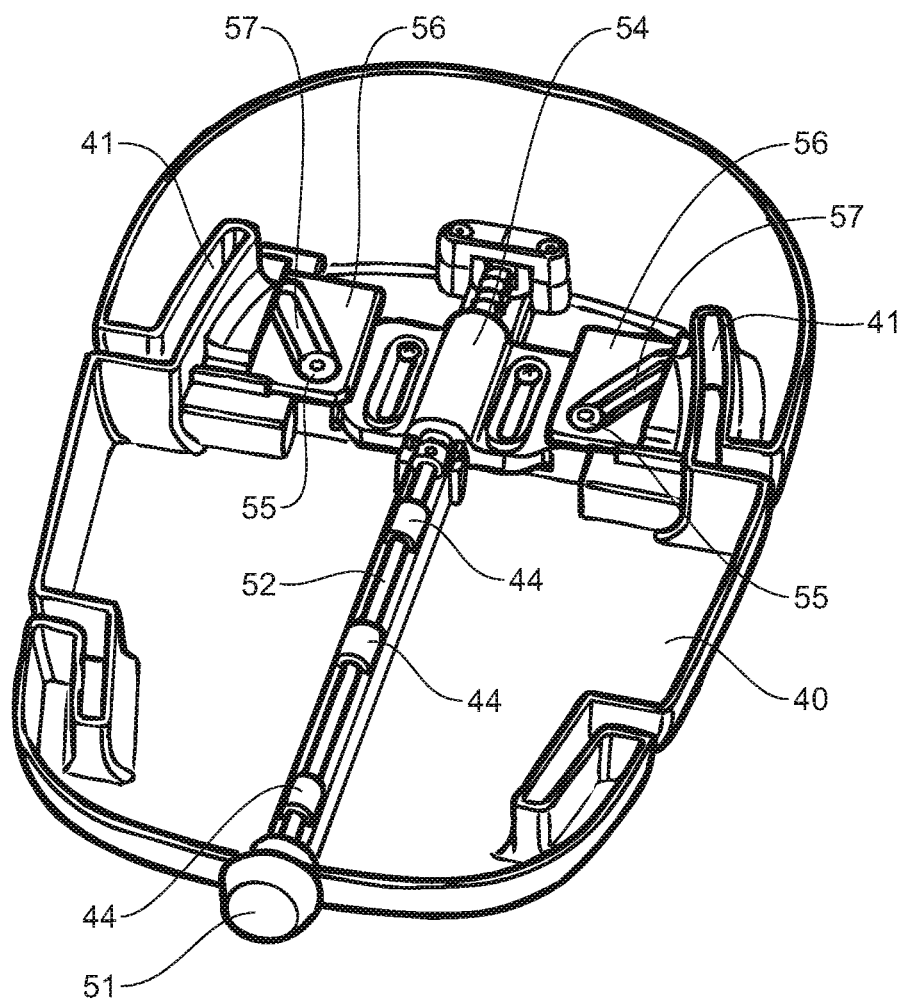
FIG. 4 is a top perspective view of the seat base of the child safety seat of FIGS. 1A and 1B, with the upper portion of the seat base removed to reveal the tensioning system in a first position.
Figure 5:
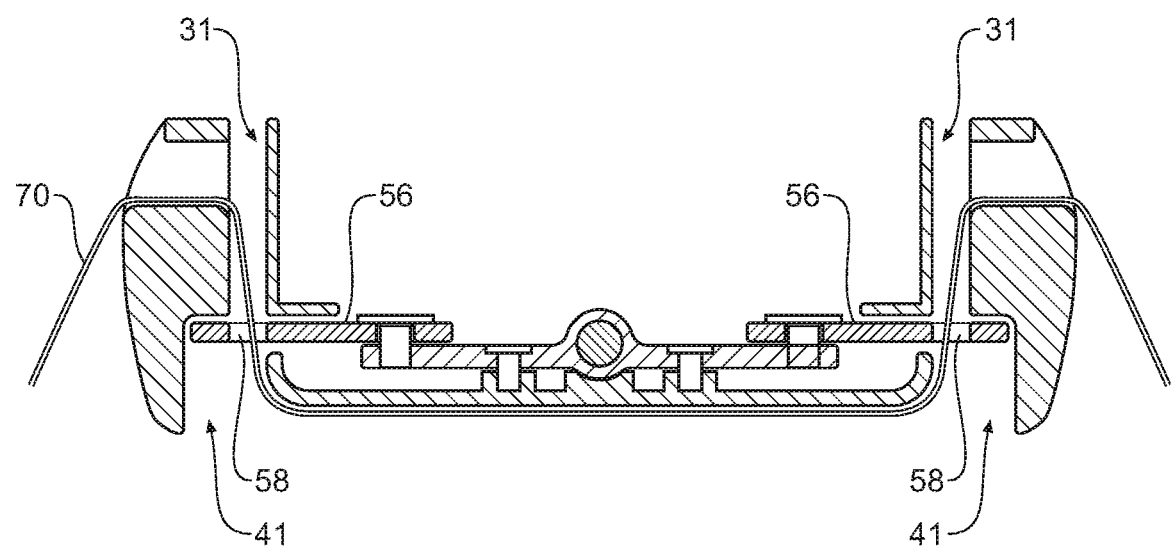
FIG. 5 is a sectional view of the seat base with the tensioning system in the first position.
Figure 6:
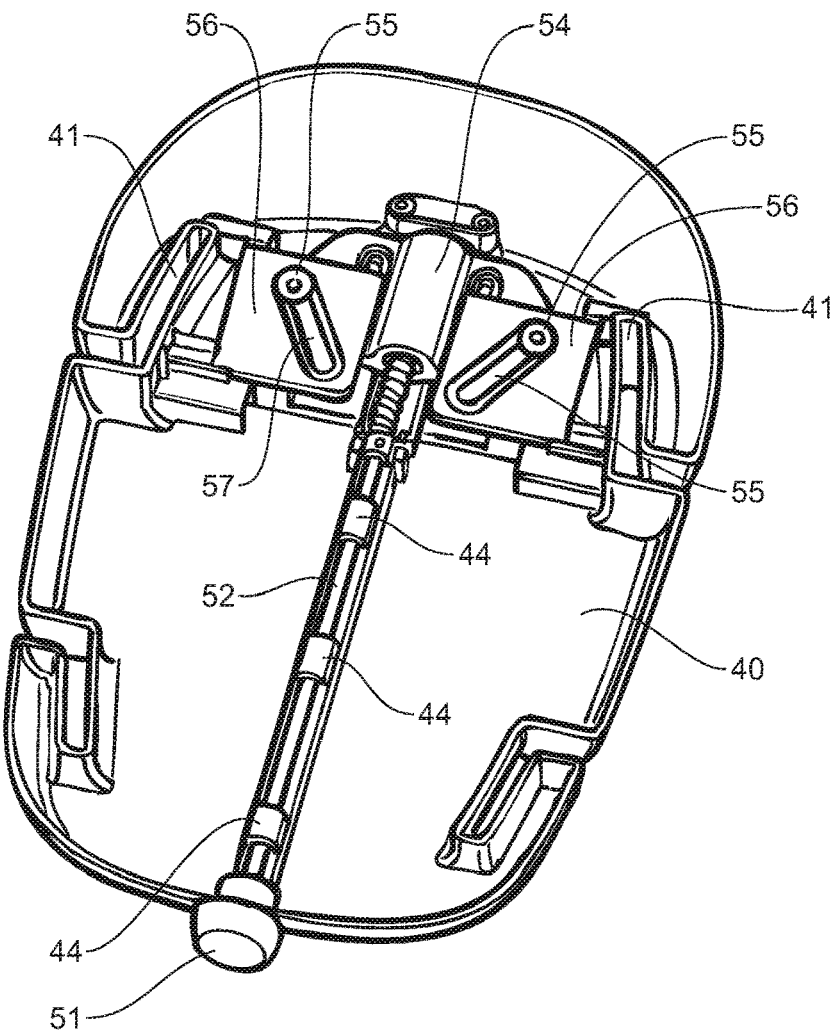
FIG. 6 is a top perspective view of the seat base of the child safety seat of FIGS. 1A and 1B, with the upper portion of the seat base removed to reveal the tensioning system in a second position.
Figure 7:
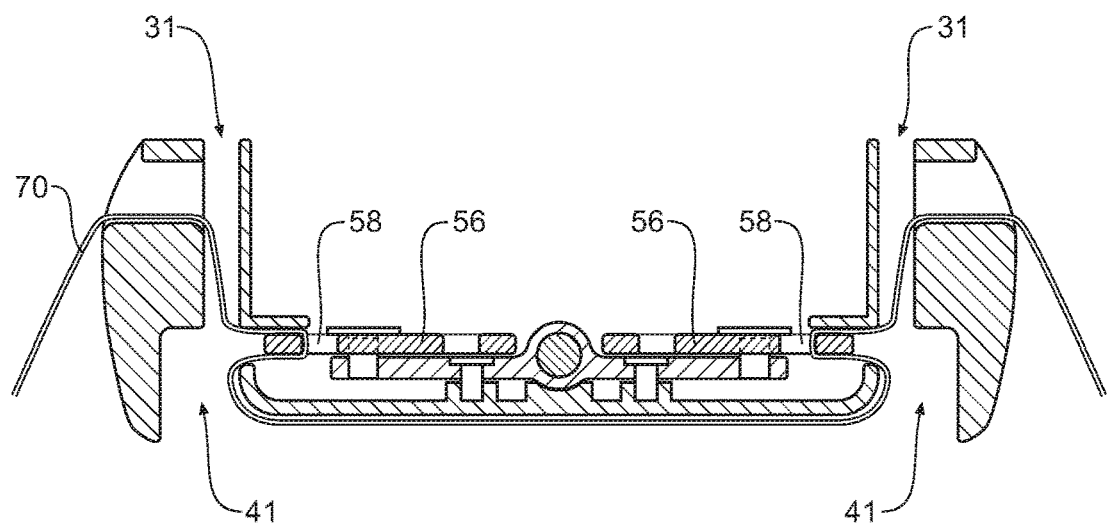
FIG. 7 is a sectional view of the seat base with the tensioning system in the second position.
Figure 8:
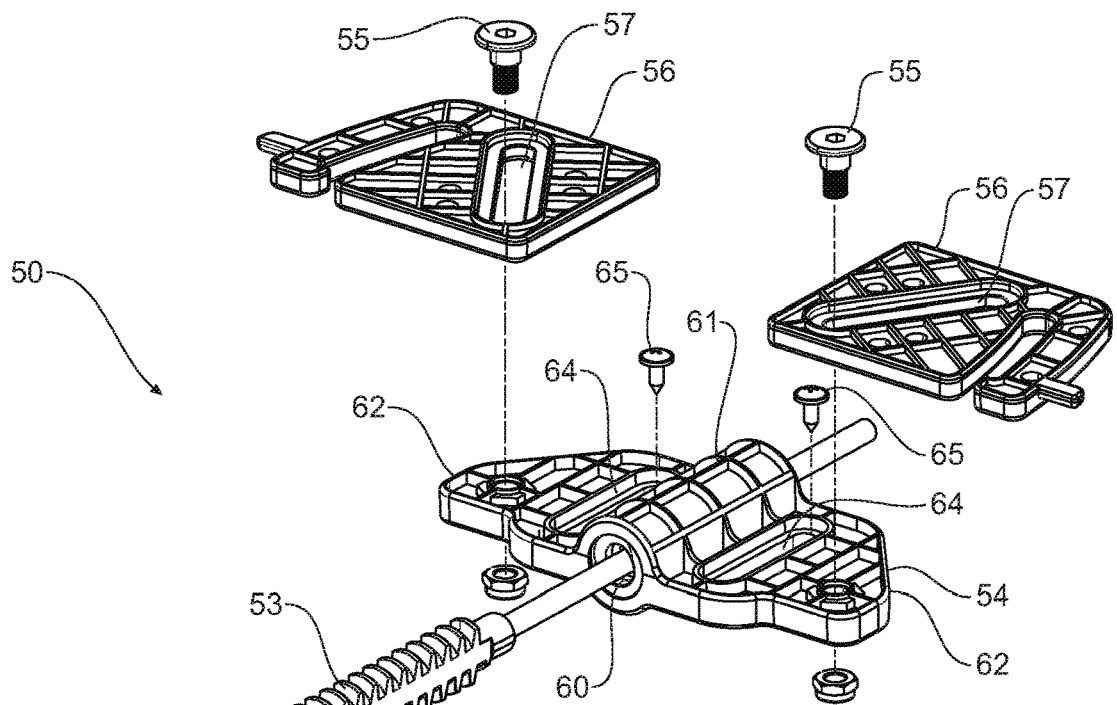
FIG. 8 is an exploded schematic of the tensioning system.
Figure 9:
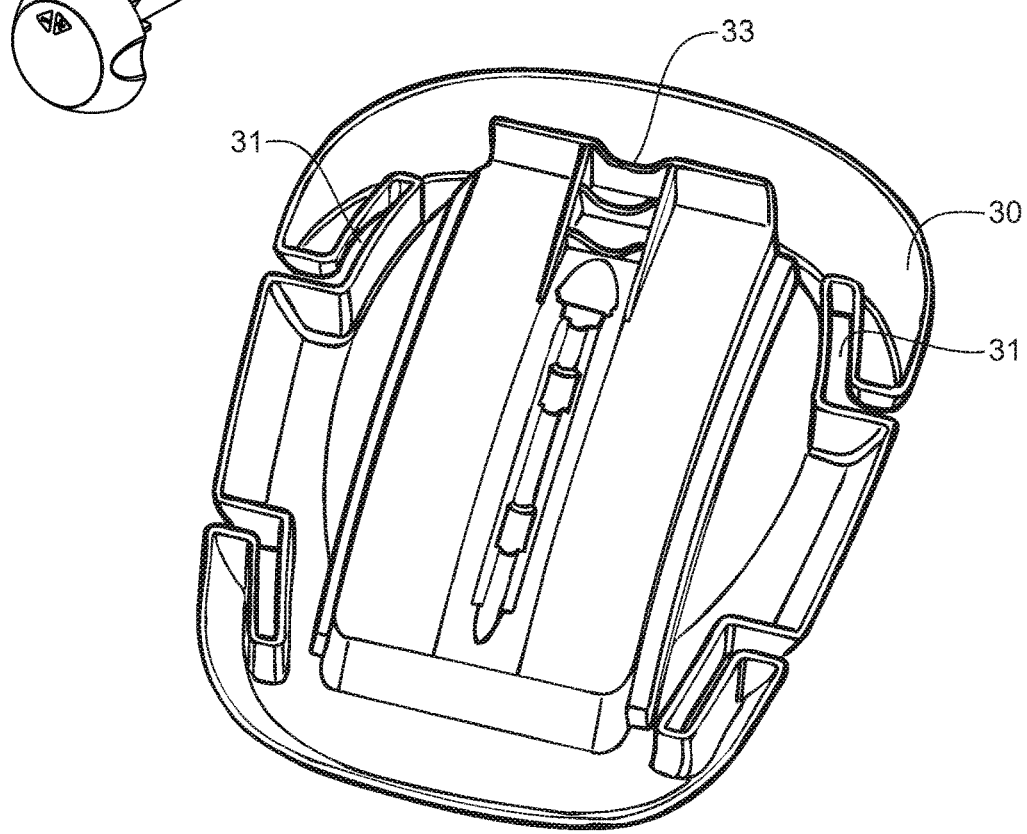
FIG. 9 is a bottom perspective view of the upper portion of the seat base.
Figure 10A:
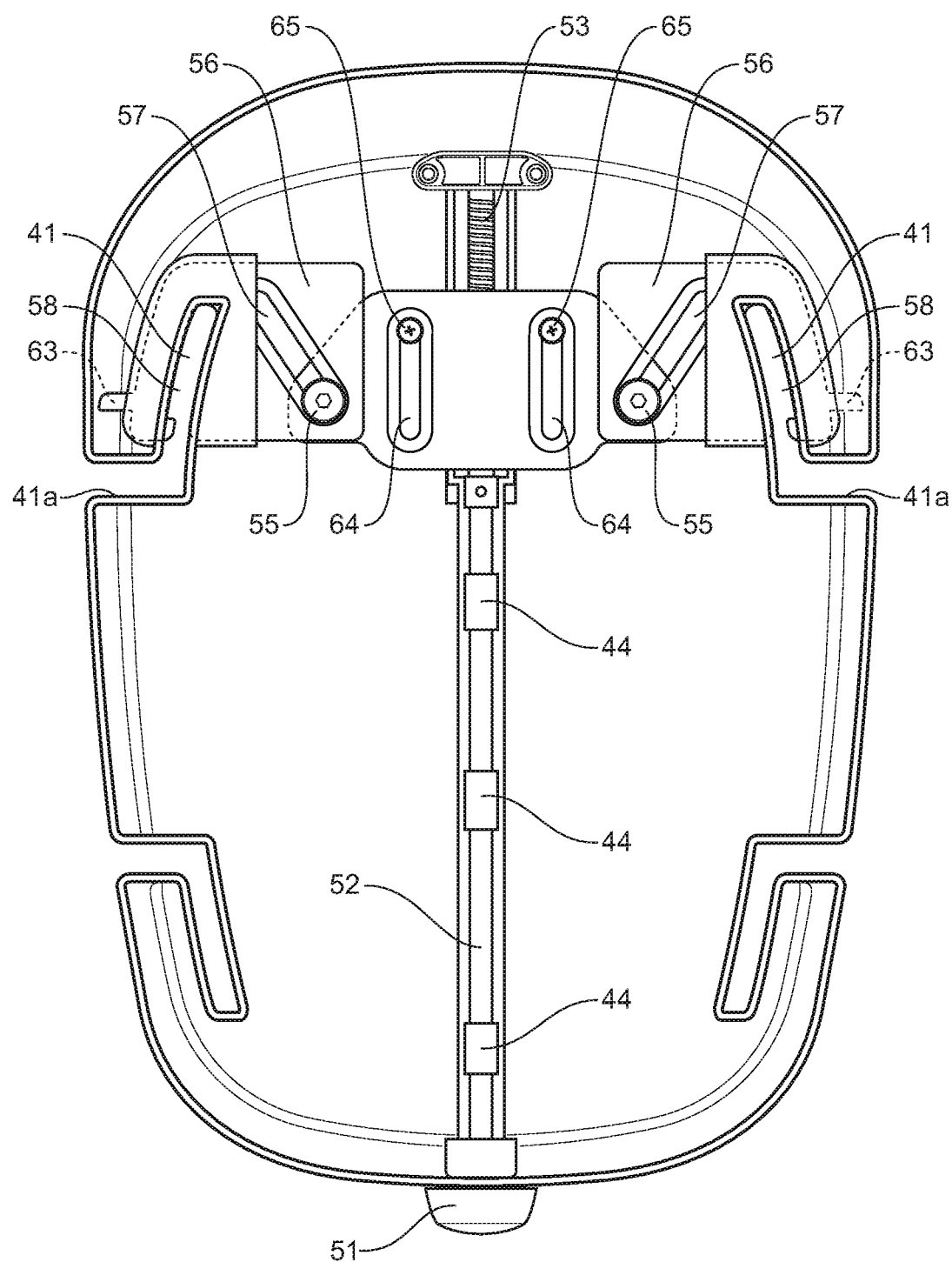
FIG. 10A is a top schematic view of the seat base of the child safety seat of FIGS. 1A and 1B, with the upper portion of the seat base removed to reveal the tensioning system in the first position.
Figure 10B:
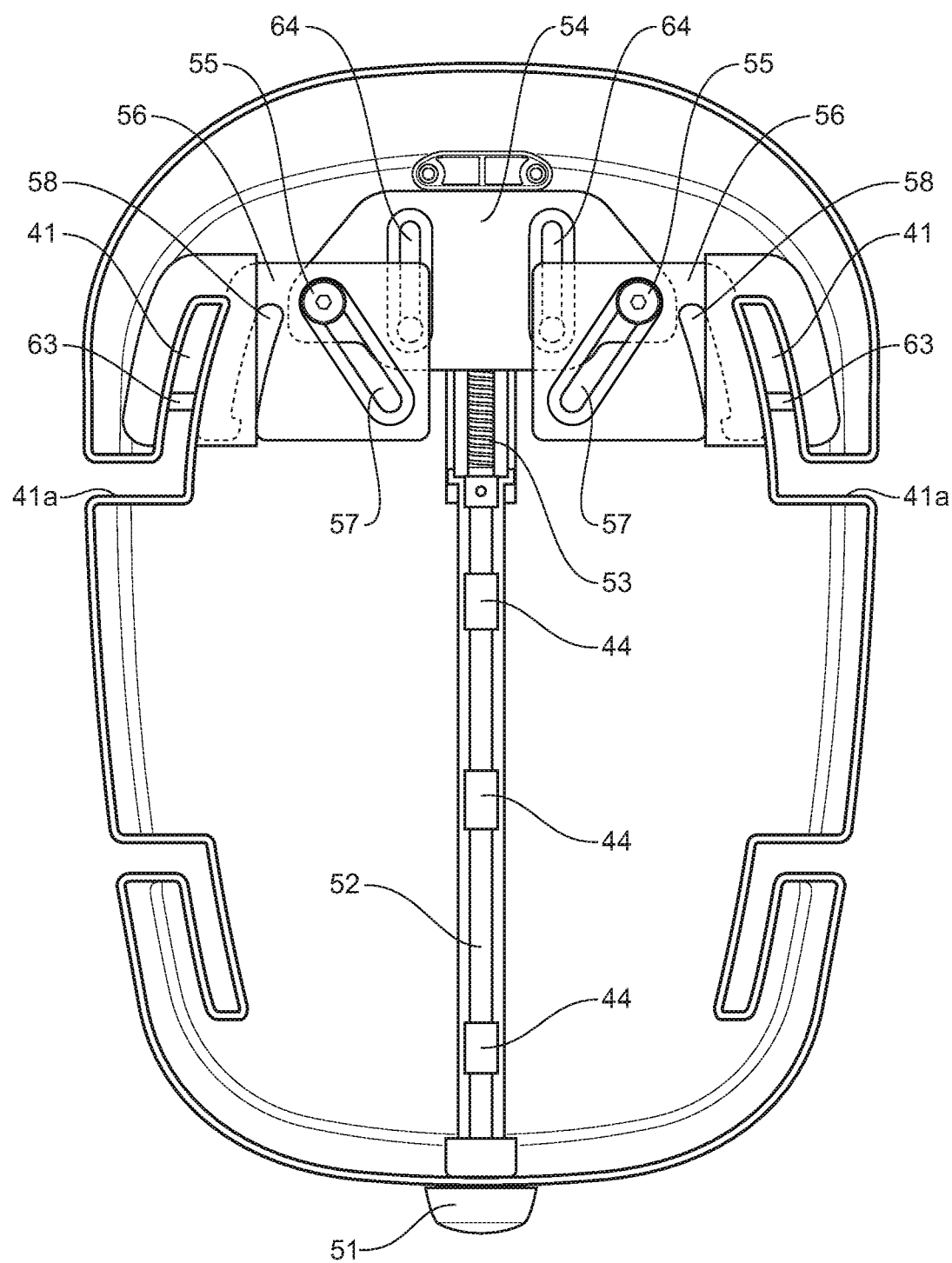
FIG. 10B is a top schematic view of the seat base of the child safety seat of FIGS. 1A and 1B, with the upper portion of the seat base removed to reveal the tensioning system in a second position.

The belt carriages 56 are adjustably movable from a first position, where the carriage belt slots 58 are aligned with the upper and lower belt slot portions 31, 41 (as shown in FIGS. 4, 5 and 10A) through to a second position, where the carriage belt slots 58 are misaligned with the upper and lower belt slot portions 31, 41 (as shown in FIGS. 6,7 and 10B).

It will be appreciated that when the belt carriages 56 are in their first position, it is possible for a user to insert the seat belt 70 through each of the upper and lower slot portions 31, 41 and the carriage belt slots 58. With particular reference to FIG. 7, it can be seen that when the belt carriages 56 are moved away from the first position and toward the second position, and the carriage belt slots 58 are no longer in alignment with the upper and lower belt slot portions 31, 41, that the effective path of travel of the vehicle seat belt 70 is increased over that of the path of travel of the vehicle seat belt 70 when the belt carriages 56 are in their first position.

It will be appreciated that the increase in the effective path of travel of the lap portion 72 of the vehicle seat belt 70 will draw more of the belt 70 within the base portion 20 of the seat 1, which will remove slack from the seat belt and have the effect of pulling the child safety seat against the vehicle seat.

The belt carriages 56 are adjustably movable by virtue of the tensioning system which is actuated by a knob 51 extending from an aperture 45 (shown in FIG. 3) located in the front of the lower base portion 40. An axle 52 is in connection with, and extends from the knob 51 back to a threaded screw portion 53, which is secured to the axle via a grub screw (not shown). The axle 52 is supported by axle bearing apertures 44 formed in the lower base portion 40. Located on the threaded screw portion 53 is a guide carriage 54 which features an internally threaded portion 60 configured to interact with the threaded screw portion 53. The guide carriage 54 further features an outer bearing surface 61 configured to bear against complementarily shaped bearing surfaces 33, 43 located in the upper and lower base portions 30, 40 respectively, and is slidably attached to the lower base portion 40 via fasteners 65 which locate in slots 64 provided in the guide wings 62 of the guide carriage, wherein the guide carriage 54 is able to slide fore and aft in relation to the lower base portion 40. It will be appreciated that the screw portion 53 and internally threaded portion 60 of the guide carriage 54 are configured to interact in a leadscrew or linear actuator arrangement, where rotation of the knob 51 in one direction causes, the axle 52 and screw portion 53 to rotate, wherein the guide carriage 54 moves forward with respect to the screw portion 53, and rotation of the knob 51 in the other direction causes the guide carriage 54 to move rearward with respect to the screw portion 53.

Figure 11A:
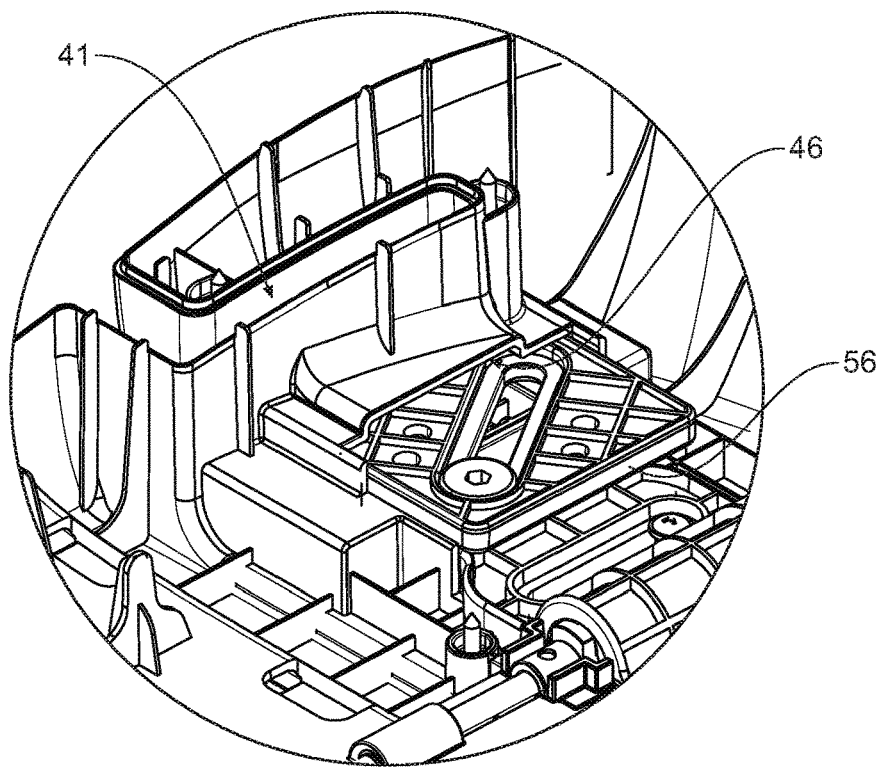
FIG. 11A is a detail view of the seat base of the child safety seat of FIGS. 1A and 1B, illustrating the relationship between the belt carriages and the carriage openings in the lower base portion.
Figure 11B:
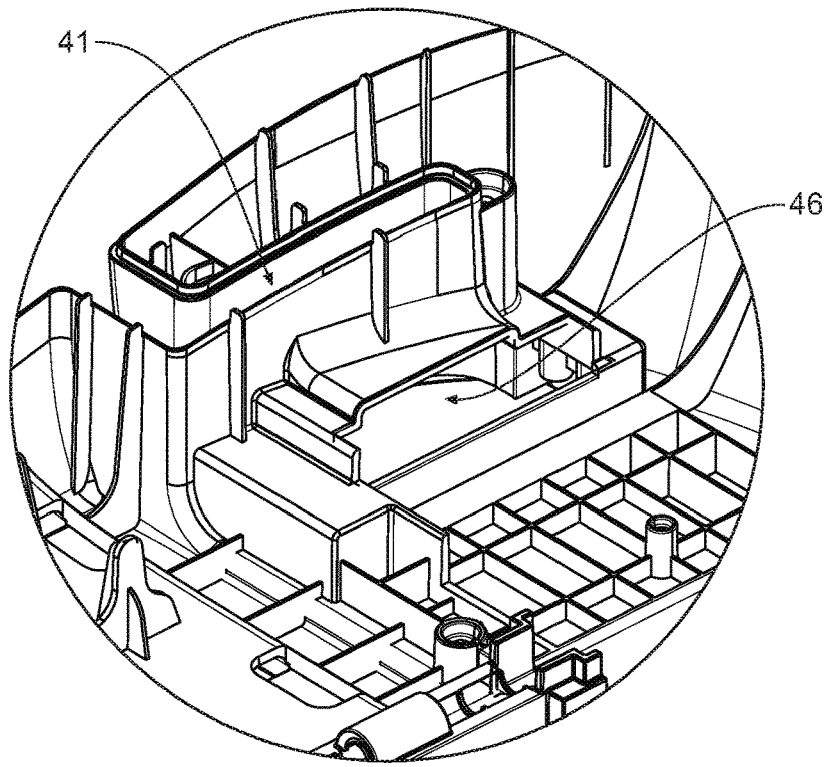
FIG. 11B is a detail view of the seat base of the child safety seat of FIGS. 1A and 1B with the belt carriage removed to reveal the carriage opening in the lower base portion.

The belt carriages 56 are slidably connected to the guide carriage 54 via a pin and slot arrangement, where each belt carriage 56 features an angled guide slot 57 configured to receive and retain the head of a guide pin 55 which is secured to guide carriage 54 via a wing 62 that extends from the outer bearing surface 61 of the guide carriage 54. The belt carriages 56 are constrained to move in a perpendicular direction with respect to the direction of movement of the guide carriage 54 by openings 46 formed in the lower base portion 40 which extend in to the lower belt slots 41 (as best shown in FIGS. 11A and 11B). It will be appreciated that by virtue of the constrained movement of the belt carriages 56 and the angle of the guide slots 57, fore and aft movement of the guide carriage 54 (caused by rotation of the knob 51) causes inward and outward movement of the belt carriages 56 respectively.

Referring now to FIGS. 10A and 10B, where it can be seen that each belt carriage 56 further comprises a block 63 which extends into the belt slots 41, preventing insertion of the lap portion 72 of the seat belt 70 from the gate 41a into the belt slot 41 when each belt carriage 56 is in a second position. This acts to prevent a user from incorrectly installing the seat.

It will be appreciated that by virtue of the leadscrew type arrangement, the belt tensioning system 50 is capable of variable adjustment of the belt path.

The child safety seat may be installed in a vehicle using the following method:

A vehicle seat belt 70 is pulled out from the seat belt retractor (not shown) and its buckle 73 is secured. The child safety seat 1 is then positioned on the vehicle seat. The anchor-side lap portion 72 of the vehicle seat belt 70 is then inserted into the anchor-side belt slot 21 via its gate 21a. The buckle-side lap portion 72 of the vehicle seat belt 70 is then inserted into the buckle-side belt slot 21 via its gate 21, such that a portion of the lap portion of the belt passes underneath the base portion of the child safety seat. The buckle-side sash portion of the vehicle seat belt is then passed through the buckle-side lower belt guide, and the retractor-side sash portion of the vehicle seat belt is then passed through the retractor-side upper belt guide such that a portion of the sash portion of the belt passes around the back of the backrest portion of the child safety seat.

As much slack as possible will then be removed from the vehicle seat belt 70 between the anchor and retractor, with the user applying weight on the child safety seat 1 and pulling the vehicle seat belt 70 toward the seat belt retractor (not shown). The belt tensioning knob 51 is then rotated such that the belt carriages 56 draw the lap portion 72 of the vehicle seat belt 70 within the base portion 20 of the child safety seat and act to remove additional slack from the vehicle seat belt 70.

It will be appreciated that the installation steps described above had a specific focus on the interaction between the child safety seat and the vehicle seat belt, and that additional installation steps may be required, such as the installation of tether straps or similar anti-rotation devices. It will also be appreciated that variations of the above installation steps may be employed.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

For instance, in an alternative embodiment, the guide carriage may be provided with slots, and the belt carriages may be provided with pins. It will further be appreciated that alternative mechanisms or linkages may be employed to move the belt carriages with respect to the seat shell.

The invention claimed is:

1. A child safety seat that is held in a vehicle by a vehicle seat belt, the child safety seat comprising:
a seat shell comprising a base section and a backrest section; and
a tensioning system that acts to alter an effective path of travel of the vehicle seat belt;
wherein the tensioning system comprises a pair of belt carriages for acting upon intermediate portions of the vehicle seat belt;
wherein the belt carriages are adjustably moveable relative to the seat shell such that the effective path of travel of the vehicle seat belt is able to be adjusted;
wherein each belt carriage comprises a carriage belt slot configured to act upon an intermediate portion of the vehicle seat belt; and
wherein the tensioning system further comprises a guide carriage slidably constrained to move in a fore and aft direction with respect to the seat shell, and the belt carriages are constrained to move in a direction perpendicular to the direction of movement of the guide carriage, and the belt carriages are slidably connected to the guide carriage, such that fore and aft movement of the guide carriage causes inward and outward movement of the belt carriages respectively.

2. The child safety seat of claim 1, wherein the belt carriages are slidably connected to the guide carriage by virtue of a pin and slot arrangement, where each belt carriage features an angled guide slot configured to receive and retain a head of a guide pin which is secured to the guide carriage.

3. The child safety seat of claim 1, wherein the tensioning system further comprises an axle and screw portion, and the guide carriage comprises an internally threaded portion, wherein the screw portion and internally threaded portion are configured to interact in a leadscrew arrangement, where rotation of the axle and screw portion in one direction causes the guide carriage to move forward with respect to the screw portion, and rotation of the axle and screw portion in the other direction causes the guide carriage to move rearward with respect to the screw portion.

4. The child safety seat of claim 1, wherein the base section comprises an upper portion and a lower portion housing the tensioning system.

5. The child safety seat of claim 4, wherein the base section comprises a pair of belt slots, each made up of respective upper and lower belt slot portions, and the belt carriages are adjustably movable from a first position, where the carriage belt slots are aligned with respective upper and lower belt slot portions such that a user can insert the vehicle seat belt through each of the upper and lower belt slot portions and the carriage belt slots, through to a second position, where the carriage belt slots are misaligned with respective upper and lower belt slot portions, such that the effective path of travel of the vehicle seat belt is increased when the belt carriages are in their first position.

6. The child safety seat of claim 5, wherein each belt carriage further comprises a block which extends into the belt slots of the base section, preventing insertion of the vehicle seat belt into the belt slots of the base section when each belt carriage is in a second position.

7. A child safety seat comprising:
a seat shell comprising a base section and a backrest section; and
a tensioning system that acts to alter an effective path of travel of a vehicle seat belt;
wherein the tensioning system comprises a pair of belt carriages for acting upon intermediate portions of the vehicle seat belt,
wherein the belt carriages are adjustably moveable relative to the seat shell such that the effective path of travel of the vehicle seat belt is able to be adjusted, and
wherein the tensioning system further comprises a guide carriage slidably constrained to move in a fore and aft direction with respect to the seat shell, and the belt carriages are constrained to move in a direction perpendicular to the direction of movement of the guide carriage, and the belt carriages are slidably connected to the guide carriage, such that fore and aft movement of the guide carriage causes inward and outward movement of the belt carriages respectively.

8. The child safety seat of claim 7, wherein each belt carriage comprises a carriage belt slot configured to act upon an intermediate portion of the vehicle seat belt.

9. The child safety seat of claim 7, wherein the belt carriages are slidably connected to the guide carriage by virtue of a pin and slot arrangement, where each belt carriage features an angled guide slot configured to receive and retain a head of a guide pin which is secured to the guide carriage.

10. The child safety seat of claim 7, wherein the tensioning system further comprises an axle and screw portion, and the guide carriage comprises an internally threaded portion, wherein the screw portion and internally threaded portion are configured to interact in a leadscrew arrangement, where rotation of the axle and screw portion in one direction causes the guide carriage to move forward with respect to the screw portion, and rotation of the axle and screw portion in the other direction causes the guide carriage to move rearward with respect to the screw portion.

11. The child safety seat of claim 7, wherein the base section comprises an upper portion and a lower portion, housing the tensioning system.

12. The child safety seat of claim 11, wherein the base section comprises a pair of belt slots, each made up of respective upper and lower belt slot portions, and the belt carriages are adjustably movable from a first position, where carriage belt slots are aligned with respective upper and lower belt slot portions such that a user can insert the vehicle seat belt through each of the upper and lower belt slot portions and the carriage belt slots, through to a second position, where the carriage belt slots are misaligned with respective upper and lower belt slot portions, such that the effective path of travel of the vehicle seat belt is increased when the belt carriages are in their first position.

13. The child safety seat of claim 12, wherein each belt carriage further comprises a block which extends into the belt slots of the base section, preventing insertion of the vehicle seat belt into the belt slots of the base section when each belt carriage is in a second position.

14. A child safety seat comprising:
a seat shell comprising a base section and a backrest section; and
a tensioning system that acts to alter an effective path of travel of a vehicle seat belt;
wherein the tensioning system comprises a pair of belt carriages for acting upon intermediate portions of the vehicle seat belt;
wherein the belt carriages are adjustably moveable relative to the seat shell such that the effective path of travel of the vehicle seat belt is able to be adjusted;
wherein the tensioning system further comprises a guide carriage slidably constrained to move in a fore and aft direction with respect to the seat shell, and the belt carriages are constrained to move in a direction perpendicular to the direction of movement of the guide carriage, and the belt carriages are slidably connected to the guide carriage, such that fore and aft movement of the guide carriage causes inward and outward movement of the belt carriages respectively; and
wherein the belt carriages are slidably connected to the guide carriage by virtue of a pin and slot arrangement, where each belt carriage features an angled guide slot configured to receive and retain a head of a guide pin which is secured to the guide carriage.

15. The child safety seat of claim 14, wherein each belt carriage comprises a carriage belt slot configured to act upon an intermediate portion of the vehicle seat belt.

16. The child safety seat of claim 14, wherein the tensioning system further comprises an axle and screw portion, and the guide carriage comprises an internally threaded portion, wherein the screw portion and internally threaded portion are configured to interact in a leadscrew arrangement, where rotation of the axle and screw portion in one direction causes the guide carriage to move forward with respect to the screw portion, and rotation of the axle and screw portion in the other direction causes the guide carriage to move rearward with respect to the screw portion.

17. The child safety seat of claim 14, wherein the base section comprises an upper portion and a lower portion housing the tensioning system.

18. The child safety seat of claim 17, wherein the base section comprises a pair of belt slots, each made up of respective upper and lower belt slot portions, and the belt carriages are adjustably movable from a first position, where carriage belt slots are aligned with respective upper and lower belt slot portions such that a user can insert the vehicle seat belt through each of the upper and lower belt slot portions and the carriage belt slots, through to a second position, where the carriage belt slots are misaligned with respective upper and lower belt slot portions, such that the effective path of travel of the vehicle seat belt is increased when the belt carriages are in their first position.

\* \* \* \* \*